United States Patent
Krasilnikov et al.

(10) Patent No.: US 12,541,405 B2
(45) Date of Patent: Feb. 3, 2026

(54) CODE EXECUTION ON A DISTRIBUTED UNIT

(71) Applicant: Amazon Technologies, Inc., Seattle, WA (US)

(72) Inventors: Nikolay Krasilnikov, Seattle, WA (US); Theodore Joseph Maka'iwi DeRego, Shoreline, WA (US); Benjamin Wojtowicz, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 601 days.

(21) Appl. No.: 17/937,346

(22) Filed: Sep. 30, 2022

(65) Prior Publication Data
US 2024/0111599 A1     Apr. 4, 2024

(51) Int. Cl.
G06F 9/455     (2018.01)
G06F 9/50      (2006.01)

(52) U.S. Cl.
CPC ........ *G06F 9/5072* (2013.01); *G06F 9/45558* (2013.01); *G06F 9/5077* (2013.01); *G06F 2009/4557* (2013.01); *G06F 2209/501* (2013.01)

(58) Field of Classification Search
CPC .. G06F 9/5072; G06F 9/45558; G06F 9/5077; G06F 2009/4557; G06F 2209/501
See application file for complete search history.

(56) References Cited

U.S. PATENT DOCUMENTS

| | | | |
|---|---|---|---|
| 9,323,556 B2 | 4/2016 | Wagner | |
| 10,231,102 B2* | 3/2019 | Agrawal | ................. H04W 4/50 |
| 12,095,853 B1* | 9/2024 | Cowan | ................. H04L 67/101 |
| 2016/0088067 A1* | 3/2016 | De Magalhaes | .......... G06F 9/50 |
| | | | 709/204 |
| 2017/0308393 A1* | 10/2017 | Chen | ................... G06F 9/45533 |
| 2017/0366551 A1* | 12/2017 | Brandwine | ............. H04L 47/70 |

(Continued)

FOREIGN PATENT DOCUMENTS

| CN | 119998791 A | 5/2025 |
|---|---|---|
| WO | WO 2024/072598 A1 | 4/2024 |

OTHER PUBLICATIONS

International Search Report and Written Opinion in International Application No. PCT/US2023/031405, dated Oct. 25, 2023 in 15 pages.

*Primary Examiner* — April Y Blair
*Assistant Examiner* — Jonathan R Labud
(74) *Attorney, Agent, or Firm* — Knobbe, Martens, Olson & Bear, LLP

(57) ABSTRACT

Systems and methods are described for implementing a distributed unit in a radio access network that executes code on behalf of mobile devices. A distributed unit may be implemented on an edge server that is in close physical proximity to a radio unit, with few or no intervening devices. The edge server may thus provide services to mobile devices, such as executing code on behalf of a mobile device in an execution environment on the edge server, at significantly lower latency than more distant cloud-based servers. The edge server may preload computing environments with code for which a mobile device is likely to request execution (e.g., because a particular application is executing on the mobile device), and may determine whether to execute code on the edge server or on a cloud provider network.

19 Claims, 6 Drawing Sheets

(56) References Cited

U.S. PATENT DOCUMENTS

| | | | |
|---|---|---|---|
| 2018/0101892 A1* | 4/2018 | Pandey | G06F 16/29 |
| 2019/0319861 A1* | 10/2019 | Pan | H04L 41/5019 |
| 2020/0026575 A1 | 1/2020 | Guim Bernat et al. | |
| 2020/0196210 A1* | 6/2020 | Kanitkar | H04W 36/12 |
| 2020/0267053 A1* | 8/2020 | Zheng | H04L 43/0852 |
| 2020/0396177 A1 | 12/2020 | Bernat et al. | |
| 2021/0168092 A1 | 6/2021 | Gupta et al. | |
| 2022/0224770 A1* | 7/2022 | Khosrowpour | H04L 67/61 |
| 2022/0383188 A1* | 12/2022 | Ananthanarayanan | G06F 18/214 |

* cited by examiner

CODE EXECUTION ON A DISTRIBUTED UNIT

BACKGROUND

Generally described, computing devices can be used to exchange information via a network. Computing devices may utilize a wireless network provided by a service provider to facilitate the exchange of information in accordance with one or more wireless communication protocols. For example, a service provider may maintain a wireless network that enables mobile computing devices to exchange information in accordance with a wireless telecommunications protocol, such as 4G (LTE), 5G, and 6G protocols. The wireless network may be comprised of individual network components, such as radio units that transmit and receive radio signals within a particular geographic area and distributed units that transmit and receive data from radio units and connect to other communications networks. Radio units may thus receive data from distributed units and transmit the data to mobile computing devices, which may process the data using the computing resources of the mobile device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
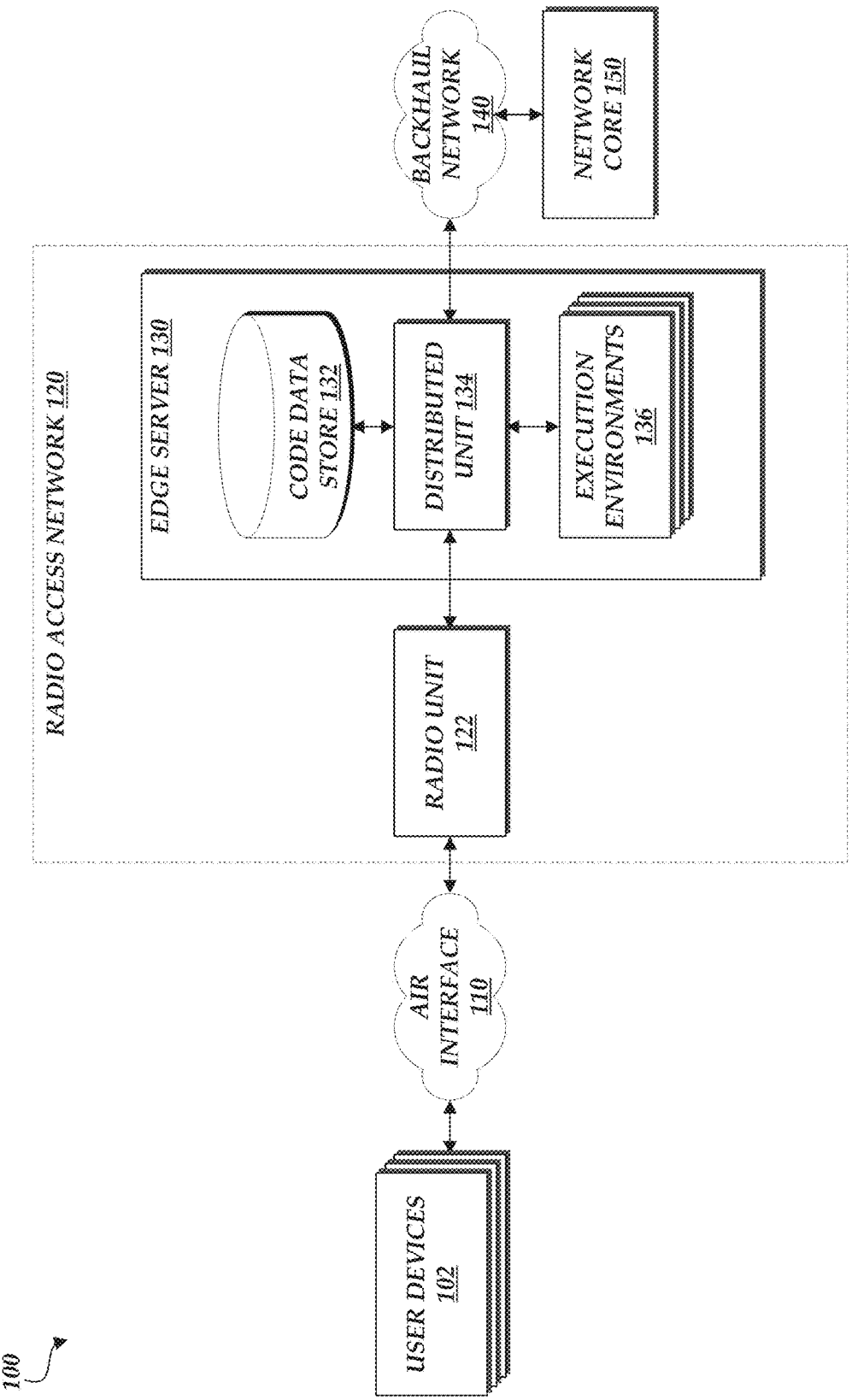
FIG. 1 is a block diagram depicting an example operating environment in which mobile computing devices may send and receive data via a radio access network, and may request that a distributed unit execute code on behalf of a mobile computing device, in accordance with aspects of the present disclosure.

Generally described, aspects of the present disclosure relate to improving the performance of mobile computing devices. More specifically, aspects of the present disclosure are directed to systems, methods, and computer-readable media related to a distributed unit in a radio access network ("RAN") that accepts requests from mobile computing devices to execute code on the distributed unit and provides the results of executing such code back to the mobile device or to another designated target. The distributed unit may thus execute code that would overtax the limited resources of a mobile computing device (e.g., code representing workloads that, if executed on the mobile computing device, would consume a significant amount of the mobile computing device's battery life, cause the mobile computing device to exceed its recommended operating temperature, or otherwise cause a suboptimal user experience for the user of the mobile computing device). The distributed unit of a RAN has significantly more computing resources than a typical mobile computing device, and, as discussed in more detail below, the distributed unit is typically only separated from the mobile computing device by a radio unit and antenna, allowing the distributed unit to execute code in scenarios where latency would prevent the mobile computing device from making use of less proximate computing environments. A distributed unit may thus deliver code execution services with improved performance relative to cloud-based implementations of these services that are hosted on more distant servers, since the more distant servers are separated from the mobile computing devices by network infrastructure that places physical limits on minimum latency and that may vary in distance and latency.

The RAN includes the antennas that communicate over the air with mobile computing devices, as well as elements such as radio units ("RUs"), distributed units ("DUs"), and centralized units ("CUs"). Collectively, the RU, DU, and CU convert an analog radio signal received from an antenna into a digital packet that can be routed over a network, and similarly convert digital packets into radio signals that can be transmitted by the antenna. This signal transformation is accomplished by a sequence of network functions that may be distributed among the RU, DU, and CU in various ways to achieve different balances of latency, throughput, and network performance. These network functions generally correspond to the lowest three network layers in the seven-layer OSI model of computer networking, and the distribution of these network functions amongst the RU, DU, and CU may be referred to as a "functional split" of the RAN.

The RU, DU, and CU may be geographically distributed, but typically at least the RU will be located close to amplifiers, filters, towers, antennas, and other hardware that are used to transmit and receive radio signals. The CU(s) of a 5G network may be remote from the antennas in a more centralized location, as discussed in more detail below, and the DU(s) may be located near the RU(s) or co-located with the CU(s). In some embodiments, the functional split of the RAN and the functions selected to run on the DU(s) may be a factor in determining the location of the DU(s) relative to the CU(s) and RU(s).

The RU, DU, and CU may be provided in different ratios to one another. For example, multiple RUs may connect to a DU, and multiple DUs may connect to a CU. Each RU may provide coverage to a different geographic area, which may partially overlap the areas of neighboring RUs in order to facilitate handoffs and provide seamless communication. DUs may generally receive data from CUs for delivery to RUs (and vice versa), and may process the data to encode or decode it, modulate or demodulate it, add or remove error correction or redundancy, or otherwise prepare data received from the CU for transmission over the air by the RU and vice versa.

RUs may generally implement "layer 1" (which may be referred to herein as "L1," "physical layer," or "PHY") functions, which correspond to the first and lowest layer in the OSI model. In 5G and other wireless protocols, these functions relate to the transmission and receipt of radio signals. The layer 1 functions may be further divided into "high PHY" functions, such as converting binary data to and from electrical pulses that represent the data, and "low PHY" or "RF" functions, such as converting the electrical pulses to and from radio waves that may be transmitted wirelessly by antennas, transmitting and receiving the radio waves during specified timing windows and on specified frequencies, and so forth. The DUs may also implement some layer 1 functions, such as encoding the digital signals to be transmitted by the RU, adding redundancy and error correction codes to the digital signals, mapping transport channels to physical channels, and so forth. In some embodiments, the DU may include specialized hardware for performing layer 1 functions, such as an accelerator card that performs signal processing functions. The DU may also implement "layer 2" (which may be referred to herein as "L2" or "data link layer") functions that correspond to the second layer of the OSI model, such as mapping logical channels to transport channels, determining the timing of the RU's digital signal transmissions within a timing window, and so forth. The L2 functions provide an interface between the higher transport layers and the physical layer. In 5G, the L2 layer has three sublayers: Media Access Control (MAC), Radio Link Control (RLC), and Packet Data Convergence Protocol (PDCP). Each of these may be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with the network layer ("layer 3" or "L3"). In 5G, the network layer is also referred to as the Radio Resource Control (RRC) layer, and is responsible for functions such as packet forwarding, quality of service management, and the establishment, maintenance, and release of a RRC connection between the mobile computing device and the RAN. CUs may generally implement layer 3 functionality.

Figure 6:
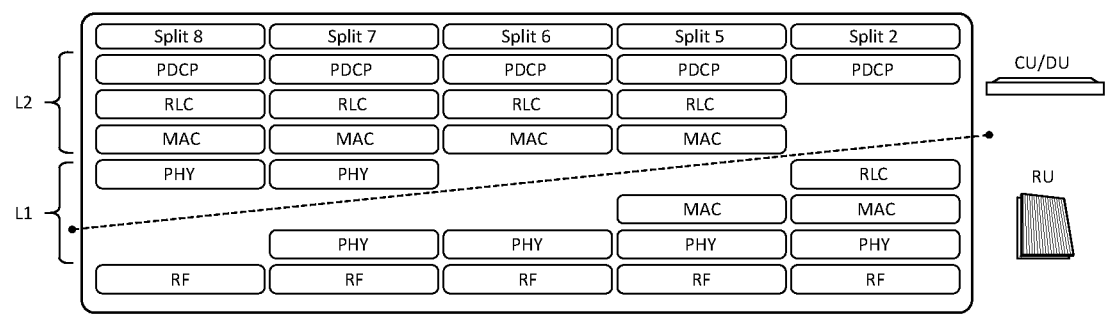
FIG. 6 is a diagram showing example functional splits that can be chosen for a 5G RAN in accordance with embodiments of the present disclosure.

FIG. 6 is a diagram showing the various functional splits that can be chosen for a 5G RAN. As shown, the functional splits define different sets of the L1 and L2 functions which are run on the RU versus on the CU and DU. The L3 functions (not depicted) are also run on the CU. In a 5G RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions.

In some embodiments, certain components of a RAN may be implemented using a cloud provider network. A cloud provider network (sometimes referred to simply as a "cloud") refers to a pool of network-accessible computing resources (such as compute, storage, and networking resources, applications, and services), which may be virtualized or provided as "bare metal" hardware. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet) and the hardware and software in cloud provider data centers that provide those services. Other components of a RAN may require or benefit from the usage of specialized hardware, such as radio transceivers or dedicated signal processors.

The cloud provider network can provide on-demand, scalable computing platforms to users through a network, for example allowing users to have at their disposal scalable "virtual computing devices", also referred to as virtual computing instances, via their use of the compute servers (which provide compute instances via the usage of one or both of CPUs and GPUs, optionally with local storage) and block store servers (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources.

The data plane can include one or more compute servers, which may be bare metal (e.g., single tenant) or may be virtualized by a hypervisor to run multiple VMs (sometimes referred to as "instances") for one or more customers. These compute servers can support a virtualized computing service of the provider network. The provider may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

Some customers may desire to use the resources and services of the cloud provider network, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a "provider substrate extension" or PSE—to be provisioned within the customer's network. A customer may access their PSE via the cloud provider substrate or their own network, and may use the same APIs to create and manage resources in the PSE as they would use to create and manage resources in the region.

The PSE may be pre-configured, e.g. by the provider network operator, with the appropriate combination of hardware with software and/or firmware elements to support various types of computing-related resources, and to do so in a manner that mirrors the experience of using the provider network. For example, one or more PSE servers can be provisioned by the cloud provider within the customer network. As described above, the provider network may offer a set of predefined instance types, each having varying types and quantities of underlying hardware resources. Each instance type may also be offered in various sizes. In order to enable customers to continue using the same instance types and sizes in their PSE as they do in the region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the region and PSE.

In one embodiment, PSE servers can host one or more VMs. The customer can use these VMs to host containers, which package up code and all its dependencies so an application can run quickly and reliably from one computing environment to another. In addition, the PSE servers may host one or more data volumes, if desired by the customer. In the region, such volumes may be hosted on dedicated block store servers. However, due to the possibility of having a significantly smaller capacity in the PSE than in the region, it may not provide an optimal utilization experience if the PSE includes such dedicated block store servers. Accordingly, the block storage service may be virtualized in the PSE, such that one of the VMs runs the block store software and stores the data of the volume. Similar to the operation of the block storage service in the region, the volumes within a PSE may be replicated for durability and availability. The volumes may be provisioned within their own VPC within the PSE. The VMs and any volumes collectively make up an extension of the provider network data plane within the PSE.

The PSE servers may, in some implementations, host certain local control plane components, for example components that enable the PSE to continue functioning if there is a break in the connection back to the region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE will remain in the region, in order to allow the customer to use as much capacity of the PSE as possible. At least some VMs that are set up at the PSE, and associated higher-level services that use such VMs as building blocks, may continue to function even during periods of time when connectivity to the provider network data centers is temporarily disrupted in some embodiments.

In the manner described above, the PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more.

Accordingly, in some embodiments, all or part of a RAN (including, but not limited to, an edge server that implements a distributed unit) may be implemented on edge location hardware that may for example be physically closer to devices such as the RU and mobile computing devices. In some embodiments, an edge location may be a provider substrate extension formed by one or more servers located on-premises at a customer or partner facility. The server(s) may communicate over a network (e.g., a publicly-accessible network such as the Internet) with a nearby availability zone or region of the cloud provider network. This type of provider substrate extension may be referred to as an "outpost" of the cloud provider network. Some outposts may be integrated into communications networks. For example, an outpost may be integrated into a base station within a telecommunications network or co-located with an RU of the network. The capacity of an on-premises outpost may be available for use only by the customer who owns the premises (and any other accounts allowed by the customer). Similarly, the capacity of an outpost integrated into a telecommunications network may be shared among a number of applications (e.g., games, virtual reality applications, healthcare applications) that send data to users of the telecommunications network. An outpost integrated into a telecommunications network may also include data plane capacity, which may be controlled at least partly by a control plane implemented in a nearby availability zone of the cloud provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations.

RAN functionality may thus be implemented on hardware (e.g., edge location hardware) that is in relatively close proximity to mobile computing devices, provides significantly more computing resources than typical mobile computing devices, and is not subject to the limits on power consumption typically found in mobile computing devices. However, mobile computing devices typically cannot access these computing resources. A mobile computing device that offloads work typically offloads the work to a service provided on a cloud provider network, such as a service that executes serverless compute functions or provides virtual machine instances. These services may provide even more computing resources and have even fewer limits on power consumption relative to an edge server. However, the servers that implement these services are typically separated from the mobile computing device by multiple network components (e.g., routers, gateways, load balancers, etc.). Each of these components will contribute latency to the interaction between the mobile computing device and the server to which it offloads work, making it impractical for the mobile computing device to offload work that requires low-latency processing. For example, it may be impractical for the mobile computing device to offload image or video processing, generation of user interfaces, or other generation or presentation of results that the user may interact with in real time or near real time. The performance and latency associated with these services may also vary significantly from one execution to the next, due to the rapid reconfiguration of resources that are not under the user's control. For example, a serverless computing system may execute code on behalf of a user in different environments at different times, and the user may have limited or no control over these environments. For some cloud-based services, a user may reserve dedicated resources to ensure consistent performance, but doing so represents an inefficient use of computing resources that are only sporadically used. The mobile computing device may thus be prevented from running applications that require significant local processing power, or may be prevented from running such applications for extended periods of time due to issues with battery consumption, device temperature under sustained heavy workloads, and the like, and may not have viable options for offloading work to a physically distant server due to issues with latency and performance variability.

To address these issues, an operator of a radio access network may implement a distributed unit that accepts and fulfills requests to execute code on behalf of mobile computing devices. As discussed in more detail below, the distributed unit may implement services that may otherwise be provided as cloud services, such as executing serverless computing functions or images of virtual machine instances, but may implement these services with lower latency by implementing them on the distributed unit, and may thus make it more practical for a mobile computing device to make use of these services. In some embodiments, the distributed unit may implement software applications for which code execution is "split" between the mobile computing device and the distributed unit, such that some functions of the application are implemented only on the distributed unit and other functions of the application are implemented only on the mobile computing device. In other embodiments, as described below, the distributed unit described herein may allow an application on the mobile computing device to determine whether to execute code on the mobile computing device or execute the code on the distributed unit, depending on factors such as available processing power, bandwidth, battery, and the like. The distributed unit may provide these services to many mobile computing devices simultaneously, since the mobile computing devices typically have transitory and temporary needs to offload work, and may provide these services at consistent performance levels (e.g., consistently low latency) relative to services that are implemented across multiple cloud-based servers and networks that vary in terms of performance and latency contributions. Additionally, in some embodiments, the distributed unit may determine whether to execute code locally (e.g., in a computing environment on an edge server) or regionally (e.g., in a region of a cloud provider network) based on various criteria as described in more detail below.

It will be understood that the techniques described herein addresses technical problems that specifically arise in the realm of computer networks, and in particular addresses problems that arise when mobile computing devices have limited local resources for executing code but cannot access remote resources with a sufficiently low latency to allow their use. It will further be understood that the technical problem described herein is not analogous to any pre-Internet practice, and that the distributed unit described herein improves the performance of a radio access network by enabling more efficient use of computing resources at both the mobile computing device and the distributed unit. A wireless network operator may thus use the techniques described herein to make more effective use of their radio access network and provide wireless telecommunications services more efficiently.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an example operating environment in which an edge server 130 may implement aspects of the present disclosure. In the depicted embodiment, the edge server 130 includes a code data store 132, a distributed unit 134 of a radio access network 120, and a number of execution environments 136 in which code may be executed on behalf of user devices 102. The distributed unit 134 may operate based on communication with radio units 122 and, via a backhaul network 140, a network core 150. The radio units 122 in turn may communicate with the user devices 102 via an air interface 110. The network core 150 may in turn communicate with devices on external networks, enabling communication between, e.g., user devices 102 and servers or other computing devices on the Internet.

In general, the user devices 102 can be any device that is operable to communicate via the air interface 110. Examples of user devices 102 include mobile phones, tablet computing devices, laptop computing devices, wearable computing devices, desktop computing devices, personal digital assistants (PDAs), hybrid PDAs/mobile phones, electronic book readers, set-top boxes, voice command devices, cameras, digital media players, servers, and the like. The air interface 110 may illustratively be an over-the-air interface to any wireless network, including but not limited to a cellular telecommunications network, Wi-Fi network, mesh network, personal area network, or any combination thereof. In some embodiments, the air interface 110 may be an interface to a Global System for Mobile Communications (GSM) network, Code Division Multiple Access (CDMA) network, Long Term Evolution (LTE) network, or combinations thereof.

The radio units 122 transmit and receive data from the user devices 102 via the air interface 110, and serve as the endpoint for these user devices 102 to access the network core 150 via the radio access network 120 and the backhaul network 140. The radio units 122 may correspond to base stations of a cellular telephone network, or in some embodiments may be deployed separately or independently from any existing cellular telephone network. In some embodiments, multiple radio units 122 may communicate with a single distributed unit 134.

The edge server 130 is described in more detail below with reference to FIG. 5, and implements a distributed unit 134 that is generally responsible for the physical layer and at least some aspects of the data link layer of the radio access network 120. The distributed unit 134 receives data from a centralized unit (which, in some embodiments, is also fully or partially implemented by the edge server 130) and transmits the data to the radio units 122 for delivery to the user devices 102. The edge server 130 further includes a code data store 132, which may illustratively be any non-transitory computer-readable storage medium, and a number of execution environments 136. The execution environments 136, in various embodiments, may be virtual machine instances, software "containers" that provide an isolated runtime environment without providing virtualization of hardware, or other environments in which code may be executed. In some embodiments, the execution environments 136 may be managed by a worker manager (not depicted in FIG. 1), which may implement some of the functionality described herein such as selecting a particular execution environment 136 in which to fulfill a particular request to execute code.

In some embodiments, the edge server 130 may implement all or part of a serverless computing environment. The term "serverless computing environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based computing environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

The serverless computing environment may provide a service enabling user devices 102 to submit or designate computer-executable code to be executed in the execution environments 136. Each set of code on the serverless computing system may define a "task," and may implement specific functionality corresponding to that task when executed in an execution environment 136 of the serverless computing system. Individual implementations of the task on the serverless computing execution system may be referred to as an "execution" of the task (or a "task execution"). The serverless computing system can further enable users to trigger execution of a task based on a variety of potential events, such as detecting new data at a network-based storage system, transmission of an application programming interface ("API") call to the serverless computing system, or transmission of a specially formatted hypertext transport protocol ("HTTP") packet to the serverless computing system. Thus, users may utilize the serverless computing system to execute any specified executable code "on demand," without requiring configuration or maintenance of the underlying hardware or infrastructure on which the code is executed. Further, the serverless computing system may be configured to execute tasks in a rapid manner (e.g., in under 100 milliseconds), thus enabling execution of tasks in "real-time" (e.g., with little or no perceptible delay to an end user). The rapid execution of tasks in the serverless computing system, together with the proximity of the edge server 130 to the user devices 102, may similarly facilitate execution of tasks with little or no perceptible delay.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular mobile application on a user device 102. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the serverless computing system in a variety of manners. In one embodiment, a user or a user device 102 may transmit a request to execute a task, which can generally be referred to as "call" to execute the task. Such calls may include the user code to be executed (or the location thereof) and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., the code data store 132 or a storage location external to the edge server 130) prior to the request being received by the serverless computing system. As noted above, the code for a task may reference additional code objects maintained at the serverless computing system by use of identifiers of those code objects, such that the code objects are combined with the code of a task in an execution environment prior to execution of the task. The serverless computing system may vary its execution strategy for a task based on where the code of the task is available at the time a call for the task is processed. A request interface of the frontend may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

While not shown in FIG. 1, the edge server 130 may implement placement services, worker managers, and other components to support execution of serverless compute functions. Embodiments of a serverless computing system that may be implemented in whole or in part by the edge server 130 are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

The edge server 130 may communicate with a network core 150 via a backhaul network 140. The backhaul network 140 may illustratively be any wired or wireless network or combination thereof. In addition, the backhaul network 140 may include, but is not limited to, the Internet, public or private intranets, cellular telecommunications networks, Wi-Fi networks, cable networks, satellite networks, mesh networks, personal area networks, local area networks (LANs), wide area networks (WANs), or other public or private communications network or networks, or any combination thereof. In some embodiments, the backhaul network 140 may be fully or partially implemented within a cloud provider network, as described in more detail below.

The network core 150, in various embodiments, is implemented in a nearby availability zone of a cloud provider network, in an on-premises edge location, at another edge location, or on other network-accessible computing resources. For example, the network core 150 may be implemented using spare capacity of an outpost that implements RAN functionality, or on a separate outpost. In some implementations, the network core may be implemented in a local zone that is proximate to the edge location which runs the RAN. The network core 150 provides control plane functionality, as described above, and performs management and control functions for the telecommunications network, such as authenticating subscribers, applying usage policies, managing UE sessions, and other control plane functions. In some embodiments, the network core 150 may support multiple RANs, and may further support RANs from multiple tenants or customers. In other embodiments, the network core 150 may be implemented on dedicated computing resources for a particular wireless network operator, which may be provided on premises or within the cloud provider network.

It will be understood that the example operating environment may include more (or fewer) elements than those shown in FIG. 1. It is not necessary, however, that all of these elements be shown in order to provide an enabling disclosure.

Figure 2:
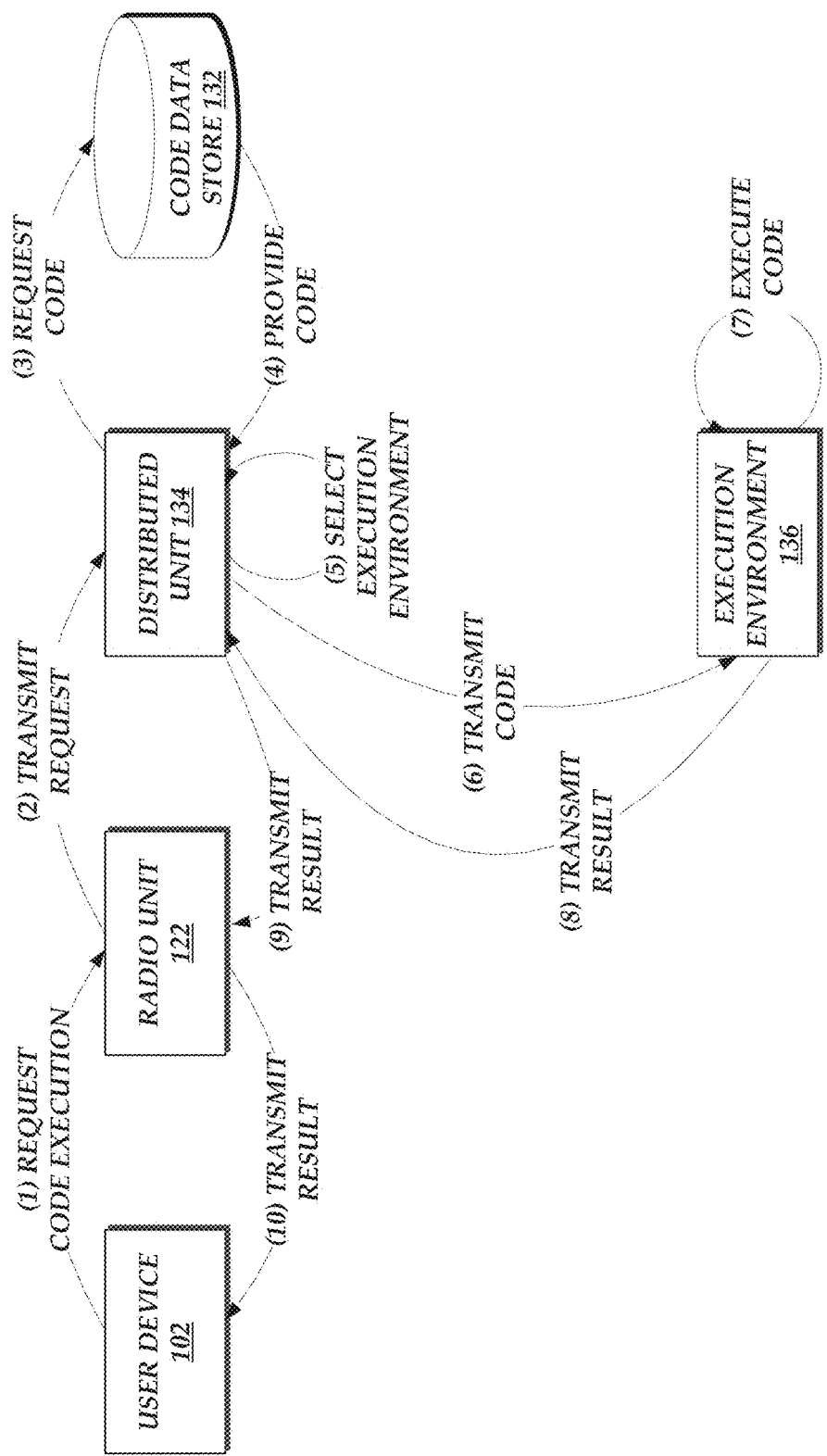
FIG. 2 is a flow diagram depicting example interactions in which a mobile computing device may request that a distributed unit execute code on its behalf, and in which the distributed unit may provide the results of executing such code, in accordance with aspects of the present disclosure.

FIG. 2 is a flow diagram depicting example interactions in which a user device 102 requests that a distributed unit 134 execute code on its behalf. Illustratively, the interactions depicted in FIG. 2 allow the user device 102 to offload code execution to the distributed unit 134 (or, in some embodiments, to a serverless computing environment in a cloud provider network) and receive the results of executing that code in an execution environment 136 that has superior computing resources to the user device 102, but is located close enough to the user device 102 that it can return results quickly. For example, the execution environment 136 may be implemented on physical hardware (e.g., the hardware of the edge server 130, as described in more detail with reference to FIG. 6 below) that is physically proximate to the radio unit 122 (e.g., in the same rack) and/or that communicates with the radio unit 122 via a single local area network within a single physical location. The interactions begin at (1), where the user device 102 transmits a request to the radio unit 122 for remote code execution. In some embodiments, the user device 102 may transmit the code to be executed. In other embodiments, the user device 102 may transmit an identifier, location, or other information that allows the code to be obtained (e.g., from a cloud-based data store). Additionally, in some embodiments, the user device 102 may transmit data to be processed by the code, either as part of the request or independently of the request. The user device 102 may typically be in direct wireless communication with the radio unit 122, with only physical hardware (e.g., an antenna) separating the two.

In some embodiments, the request transmitted by the user device 102 may be generated by an application executing on the user device 102. In various embodiments, the application may determine whether to execute code on the user device 102, in an execution environment 136 hosted by the distributed unit 134, or in an execution environment hosted by another platform (e.g., an environment at the region). The determination may be made, for example, based on factors such as a maximum latency requirement (e.g., how long the application has before it must display a result) and/or the availability of various resources on the user device 102, such as battery level, processor, memory, storage, and the like. In some embodiments, the application may consider whether the operating temperature of the user device 102 would exceed acceptable limits if a sustained workload were executed, or may consider whether a predicted quantity of computing resources that executing the code would utilize exceeds acceptable limits. In other embodiments, the user device 102 may generate and transmit the request to execute code, and may similarly determine whether to request code execution.

At (2), the radio unit 122 relays the request to the distributed unit 134. In embodiments where the user device 102 transmits a code identifier or location rather than transmitting the code, the distributed unit 134 (or, in some embodiments, the edge server 130) at (3) requests the code from a code data store 132. In some embodiments, the code data store 132 may store software images that can be loaded into a virtual machine instance and executed. Such images may include, for example, operating systems, runtime libraries, utilities, or other content. The images may also include user-specific code, or, in some embodiments, the request may include code to be loaded and executed once the image has been loaded on a virtual machine instance. In other embodiments, the code data store 132 may store code such as serverless compute functions, which, as described above, may be executed in an execution environment 136 whose configuration is not specified or controlled by the user. In embodiments where code is requested from the code data store 132, the code data store 132 returns the requested code at (4).

At (5), the distributed unit 134 (or, in some embodiments, another component of the edge server 130, such as a worker manager) selects an execution environment 136 from a plurality of execution environments 136 on the edge server 130. As described above, the execution environment 136 may be a virtual machine instance, container, or other environment in which the request to execute code may be fulfilled. In some embodiments, the execution environment 136 may be selected based on the code, the request, a previous execution of the code, or other information. For example, an execution environment 136 having a particular set of computing resources allocated to it may be selected based on the quantities of computing resources consumed during one or more previous executions of the code. As a further example, the request may specify a maximum acceptable latency or delay before a result should be returned, and the execution environment 136 may be selected based on performance criteria that indicate it will return a result within that timeframe. In some embodiments, the distributed unit 134 may determine whether to execute the code in an execution environment 136 hosted by the edge server 130 or an execution environment hosted at a region. At (6), the distributed unit 134 transmits the code (and, in some embodiments, data to be processed, configuration information, and the like) to the selected execution environment 136.

At (7), the execution environment 136 fulfills the request by executing the code and generating a result. Illustratively, the code may generate information or user interface elements that are presented in a user interface by the user device 102, and the result may be the generated information or elements. For example, the code may process image data or video data captured by the user device 102, perform various transformations (e.g., color correction, image stabilization, inserting content for an augmented reality display, etc.), and provide the results in real time or near real time for display to the user. As a further example, the code may process audio input and perform speech-to-text or translation services. In general, it will be understood that the code may perform any task or function that could utilize computing resources beyond (or in addition to) those available on the user device 102, or that could substitute for the computing resources available on the user device 102 to preserve battery life, processor availability, or other resources. It will further be understood that offloading code execution to an execution environment 136 hosted by the edge server 130 may allow the code to be executed and a response provided with significantly lower latency than executing the code in a environment more distant from the user device 102.

At (8), the execution environment 136 transmits the result of executing the code to the distributed unit 134. In some embodiments, the execution environment 136 may transmit the result in a format accepted and expected by the user device 102. In other embodiments, the distributed unit 134 (or another component of the edge server 130) may convert the result provided by the execution environment 136 into a format understood by the user device 102. The distributed unit 134 may further format the result in accordance with 5G or other standards for transmitting information over the air. At (9), the distributed unit 134 may transmit the (formatted) result to the radio unit 122, which at (10) may transmit the result over the air interface to the user device 102.

It will be understood that FIG. 2 is provided for purposes of example, and that many variations on the depicted interactions are within the scope of the present disclosure. For example, the distributed unit 134 may perform the interaction at (5) and select the execution environment 136 prior to obtaining code from a data store. As a further example, as discussed above, another component of the edge server 130 or the edge server 130 itself may perform any or all of the interactions at (3), (4), (5), (6), and (8). FIG. 2 is thus understood to be illustrative and not limiting.

Figure 3:
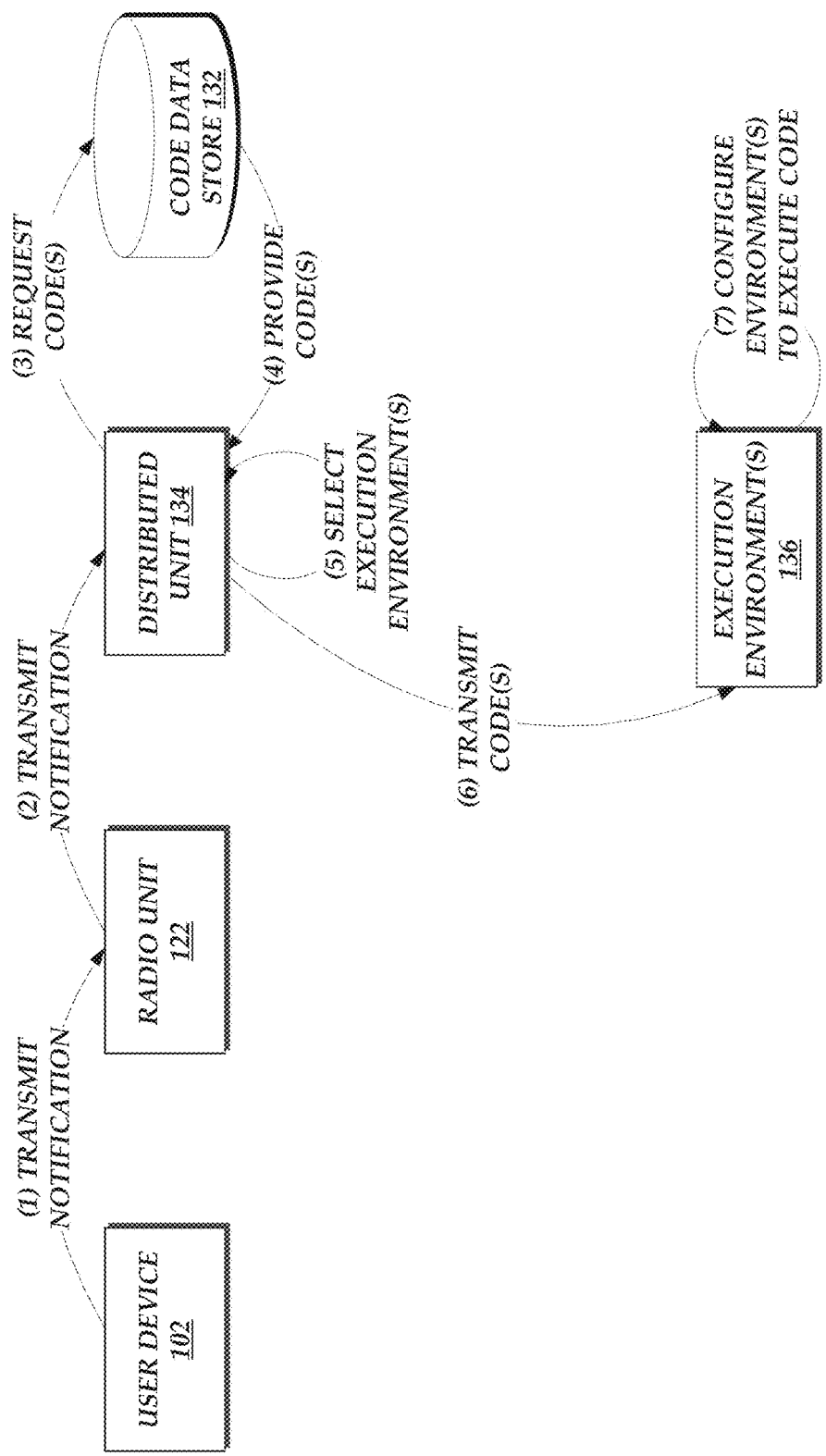
FIG. 3 is a flow diagram depicting example interactions in which a mobile computing device may notify a distributed unit that an application is running that may transmit requests to execute code, and in which the distributed unit prepares an environment to execute code that the application is likely to request, in accordance with aspects of the present disclosure.

FIG. 3 is a flow diagram depicting example interactions in which a user device 102 may notify a distributed unit 134 that it may request code execution on the distributed unit 134 in the near future, and in which the distributed unit 134 may prepare an execution environment 136 in which to execute code that the user device is likely to request. The example interactions in FIG. 3 may be carried out, for example, when the user device 102 runs a particular application that requests code execution(s) on the distributed unit 134. For example, the interactions may be carried out when the user device 102 runs an autonomous reality ("AR") application that frequently requests code execution to assist with placing objects in the AR stream. As further examples, the user device 102 may detect that it is running out of memory or storage, has more of a workload than it can handle with available computing resources, or that it should offload work to the distributed unit 134 to preserve its battery life. The interactions begin at (1), where the user device 102 transmits a notification to the radio unit 122 that the user device 102 may request code execution on the distributed unit 134 in the near future. In some embodiments, the notification may specify code that the user device 102 is likely to request. For example, an application may be associated with one or more tasks that can be executed on the distributed unit 134 and are stored in the code data store 132. The notification may thus identify these tasks (or, in some embodiments, may identify the application and thus allow the distributed unit 134 to identify the tasks). In some embodiments, the user device 102 may have particular tasks that it offloads to the distributed unit 134 when certain conditions are satisfied. For example, the user device 102 may request that the distributed unit 134 execute code that generates a map display including the real-time location of the user device 102 when the user has input a destination that is sufficiently distant, such that continually redrawing the map on the user device 102 may exhaust the available battery before the user reaches the destination. At (2), the radio unit 122 transmits the notification to the distributed unit 134, which as discussed above may be implemented on hardware that is physically proximate to the radio unit 122.

In some embodiments, the distributed unit 134 may determine whether to act on the notification received at (2). For example, the distributed unit 134 may determine whether it has idle execution environments 136 that can be configured in advance to execute code the user device 102 is likely to request. As a further example, the distributed unit 134 may assess previous executions of a particular application to determine a likelihood that the user device 102 will actually make a request, and may only configure an execution environment 136 for the user device 102 if that likelihood exceeds a threshold. In further embodiments, the distributed unit 134 may determine the latency of a regional execution environment and then determine whether requests from the user device 102 can be fulfilled in the regional execution environment rather than the execution environment 136 of the distributed unit 134. If the distributed unit 134 determines not to act on the notification, then the interactions at (3), (4), (6), and (7) may be omitted.

At (3), the distributed unit 134 requests that the code data store 132 provide code(s) for which the user device 102 is likely to request execution. In some embodiments, as described above, the notification may identify a number of tasks that the user device may request be executed on the distributed unit 134, and the distributed unit 134 may retrieve the code associated with some or all of these tasks. Illustratively, the distributed unit 134 may obtain the code associated with a subset of the tasks based on factors such as the time required to load the task, the maximum acceptable latency for returning a result of executing the task, how often or how likely the user device 102 is to request execution of the task (e.g., based on previous executions of an application that requests execution of the task, previous requests from the user device 102, or other historical data), or the number of idle execution environments 136 available. At (4), the code data store 132 returns the requested code(s).

At (5), the distributed unit 134 (or, in some embodiments, another component of the edge server 130, such as a load balancer or worker manager) selects an execution environment or environments 136 to prepare to execute the code(s) obtained at (4). In some embodiments, the distributed unit 134 may cause code to be loaded into an execution environment 136, such that the environment 136 is ready to execute the code immediately upon receipt of a request to do so. In other embodiments, the distributed unit 134 may provision an execution environment 136. For example, the notification may indicate that a request to execute a particular software image on a virtual machine instance is forthcoming. The distributed unit 134 may thus provision and configure a virtual machine instance with the resources needed to execute the software image, and in some embodiments may further load the software image in preparation for executing it. In some embodiments, the distributed unit 134 may determine whether to provision and/or configure an execution environment 136 based on factors such as workload (e.g., whether there are other pending requests to utilize execution environments 136 on the edge server 130), a predicted amount of time before the user device 102 makes the request, or other factors. In some embodiments, carrying out any or all of the interactions at (3), (4), (5), (6), and (7) may be deferred based on an expected arrival time of the request from the user device 102.

At (6), the distributed unit 134 transmits the code(s) the user device 102 is likely to request to the execution environment(s) 136 (or, in some embodiments, to another component such as a worker manager). In some embodiments, the distributed unit 134 may also transmit configuration information, such as computing resources to be allocated to a virtual machine instance, hardware that the virtual machine instance should emulate, and the like. At (7), the execution environment(s) 136 are configured to execute the code that the user device 102 is likely to request. In some embodiments, the code may be loaded and partially executed (e.g., if there are initialization steps that can be performed without input) prior to receiving a request from the user device 102 to execute the code.

In some embodiments, a user device 102 may "reserve" an execution environment 136 that it expects to use during execution of a time-sensitive task on the user device 102, and may thereby omit or pre-perform some of the interactions in FIG. 2, such the selection of an execution environment 136 at (5) and the interactions at (3), (4), and (6) for obtaining code and loading code into the selected execution environment 136. In further embodiments, as discussed above, the distributed unit 134 may proactively reserve an execution environment 136 in response to a notification, depending on factors such as whether an idle environment 136 is available and is not expected to be used before the user device 102 requires it.

It will be understood that FIG. 3 is provided for purposes of example, and that many variations on the depicted interactions are within the scope of the present disclosure. For example, the distributed unit 134 may provision an execution environment 136 to execute several possible tasks that the user device 102 might request, and may thus defer loading the code for a particular task into the execution environment 136 until a request is received. As a further example, the user device 102 may transmit the code to be requested as part of the notification at (1), and the interactions at (3) or (4) may be omitted. Still further, another component of the edge server 130 or the edge server 130 itself may perform any or all of the interactions at (3), (4), (5), and (6). FIG. 3 is thus understood to be illustrative and not limiting.

Figure 4:
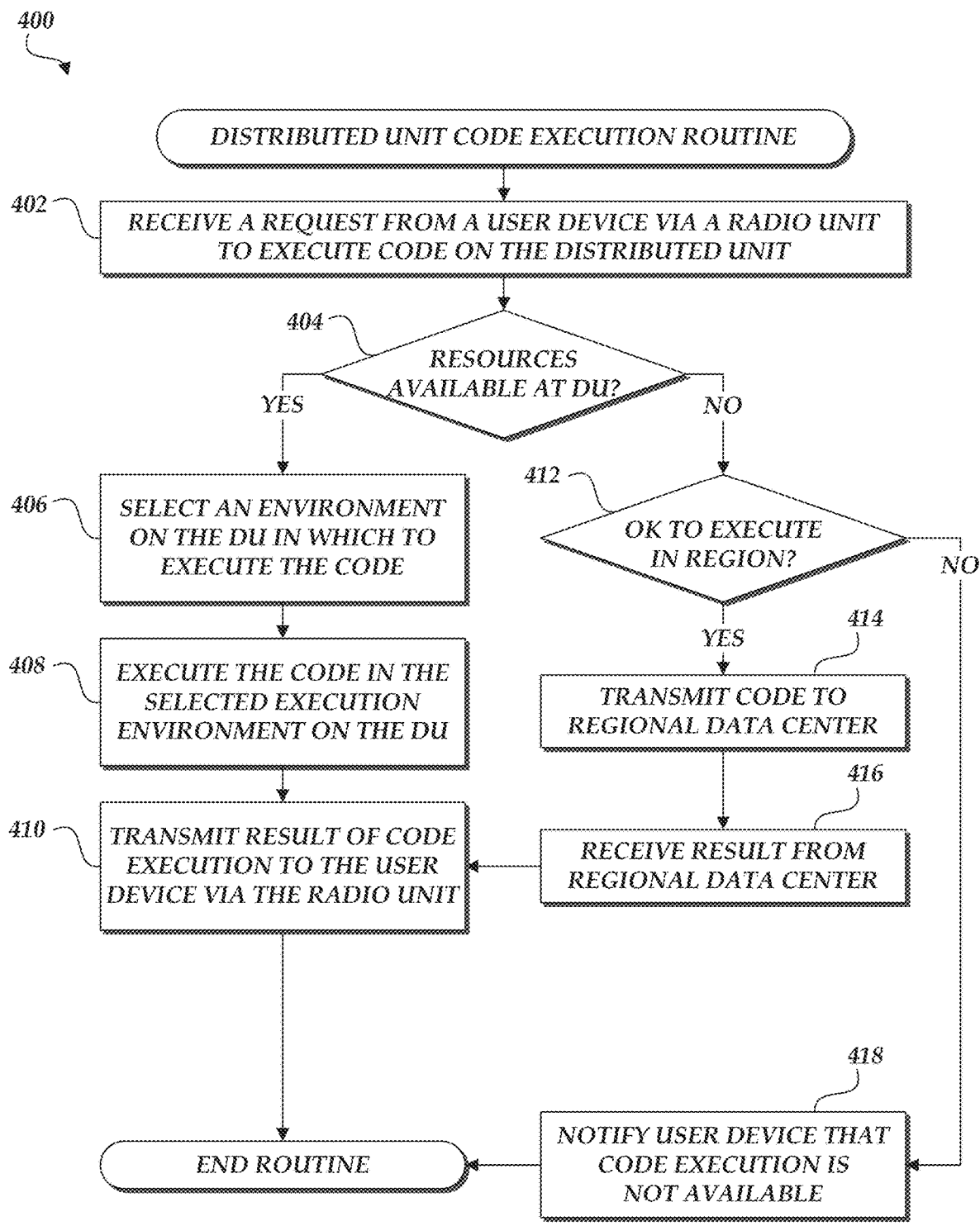
FIG. 4 is a flow chart depicting an example routine for processing requests to execute code on a distributed unit in accordance with aspects of the present disclosure.

FIG. 4 is a flowchart depicting an example routine 400 for processing requests to execute code on a distributed unit in accordance with aspects of the present disclosure. All or part of the example routine 400 may be carried out, for example, by the distributed unit 134 depicted in FIG. 1 and/or other components of the edge server 130. The example routine 400 begins at block 402, where a request may be received from a user device via a radio unit to execute code on the distributed unit. In some embodiments, as discussed above, the request may be to execute code and return a result within a specified amount of time, and the routine 400 may determine whether code execution on the distributed unit is required in order to satisfy the latency requirement. Additionally, as discussed above, the request may include the code that is to be executed or an identifier or other reference that allows the code to be obtained.

At decision block 404, a determination may be made as to whether resources are available to execute the requested code. In some embodiments, the determination may be as to whether an execution environment is available. In other embodiments, the determination may be as to whether an execution environment can be provided without degrading the performance of the distributed unit at other tasks, such as transmitting and receiving data from the radio unit. For example, the edge server may provision a pool of execution environments, and then may implement distributed unit functionality in a subset of these execution environments. The quantity and/or size of execution environments needed to implement distributed unit functionality may vary depending on, e.g., the amount of data to be transmitted to the radio unit within a given timeframe, the amount of data to be received from the radio unit within a given timeframe, and so forth. In some embodiments, the edge server may reserve execution environments or computing resources to ensure that distributed unit functionality is implemented, and then make the remaining environments or resources available for executing code upon request. If the determination at decision block 404 is that sufficient resources are available, then at block 406 an environment in which to execute the code may be selected. As described above, the environment may be selected based on the code to be executed, which in some embodiments may be a software image to be loaded onto a virtual machine instance having a particular configuration. In other embodiments, an execution environment may be provisioned and/or configured at block 406.

At block 408, the code may be executed in the selected execution environment, which may produce an execution result. In some embodiments, as discussed above, the result may be in a format understood by the user device, and may be transmitted to the user device without modification. In other embodiments, the result may require conversion or translation in order to be usable by the user device, and this conversion or translation may be performed. At block 410, the (processed) result is transmitted to the user device via the radio unit, after which the routine 400 ends.

If the determination at decision block 404 is instead that sufficient resources are not available to execute the requested code, then at decision block 412 a determination may be made as to whether the code can be executed in a region of a cloud provider network. Illustratively, the determination may be as to whether the latency associated with executing the code in a region is below a maximum acceptable latency, which in some embodiments may be included in the request. If the determination is that the code can be executed in a region, then at block 414 the code may be transmitted to a regional data center, which may execute the code and generate a result that may be received at block 416. The routine 400 then branches to block 410, where the result may be transmitted to the user device via the radio unit. Alternatively, if the determination a decision block 412 is that the code cannot be executed in a region, then at block 418 the distributed unit may report to the user device that it cannot fulfill the request to execute the code in the requested timeframe. In some embodiments, a determination may be made as to when sufficient resources will be available at the distributed unit, and then whether the result may be obtained more quickly by waiting or by executing the code in the region. In other embodiments, blocks 412, 414, and 416 may be omitted and the routine 400 may simply notify the user device 102 that code execution is not available. In some embodiments, the routine 400 may instead provide an estimated time to the user device as to when the result will be available, allowing the user device to determine whether to cancel the request (and, in some embodiments, execute the code locally) or wait.

It will be understood that references to the "distributed unit" in the example routine 400 may also refer to other components of the edge server or to the edge server itself. That is, in some embodiments, the edge server may implement a distributed unit that receives requests to execute code and a worker manager that carries out these requests, and the worker manager may thus carry out portions of the example routine 400 such as blocks 404, 406, 408, 412, 414, and 416. It will further be understood that FIG. 4 is provided for purposes of example, and that many variations on the example routine 400 are within the scope of the present disclosure. For example, in some embodiments, the routine 400 may include obtaining the code from a data store or other source, as described in more detail above. As a further example, decision block 412 may be carried out prior to decision block 404, and the computing environments at the distributed unit may be used only if necessary. FIG. 4 is thus understood to be illustrative and not limiting.

Figure 5:
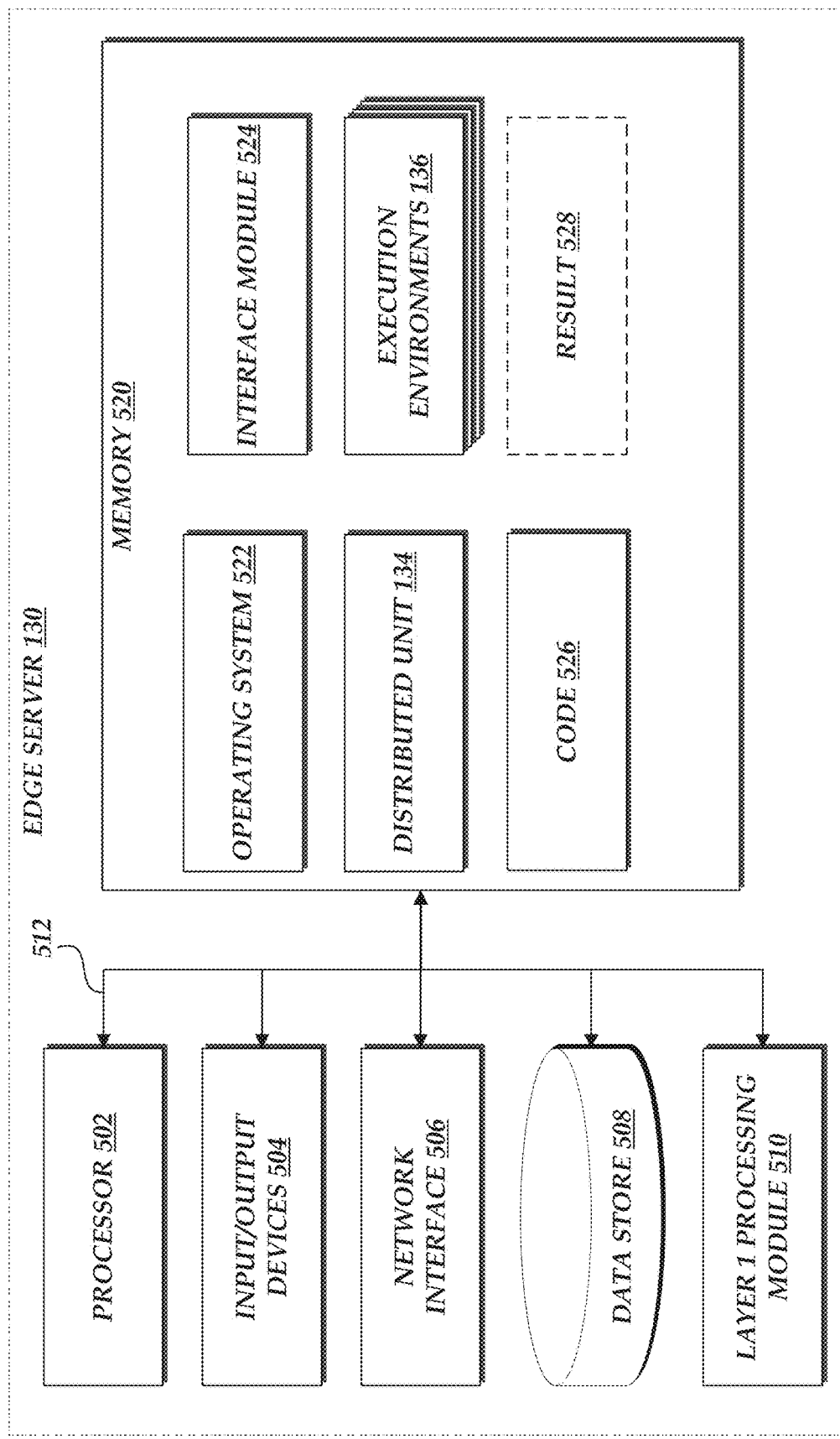
FIG. 5 is a block diagram depicting a general architecture of a computing device that is configured to implement a distributed unit that operates in accordance with aspects of the present disclosure.

FIG. 5 depicts a general architecture of a computing system (referenced as edge server 130) that implements aspects of the present disclosure such as a distributed unit that executes code on behalf of user devices. The general architecture of the edge server 130 depicted in FIG. 5 includes an arrangement of computer hardware and software modules that may be used to implement aspects of the present disclosure. The hardware modules may be implemented with physical electronic devices, as discussed in greater detail below. The edge server 130 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1.

As illustrated, the edge server 130 includes a processor 502, input/output device interfaces 504, a network interface 506, a data store 508, a layer 1 processing module 510, and a memory 520, all of which may communicate with one another by way of a communication bus 512. The network interface 506 may provide connectivity to one or more networks or computing systems, such as other components of the operating environment 100 depicted in FIG. 1. The processor 502 may thus receive information and instructions from other computing systems or services. The processor 502 may also provide output information for an optional display (not shown) via the input/output device interfaces 504. The input/output device interfaces 504 may also accept input from an optional input device (not shown). In some embodiments, the edge server 130 may further include a layer 1 processing module 510. The layer 1 processing module 510 may implement "layer 1" or "physical layer" functions related to the transmission and receipt of radio signals, such as encoding the digital signals to be transmitted by the RU, adding redundancy and error correction codes to the digital signals, mapping transport channels to physical channels, and so forth. In some embodiments, the layer 1 processing module 510 may be implemented using specialized hardware (not shown) for signal processing and other layer 1 functions, such as an accelerator card or other hardware.

The memory 520 may contain computer program instructions (grouped as modules in some embodiments) that the processor 502 executes in order to implement one or more aspects of the present disclosure. The memory 520 generally includes random access memory (RAM), read only memory (ROM) and/or other persistent, auxiliary or non-transitory computer readable media. The memory 520 may store an operating system 522 that provides computer program instructions for use by the processor 502 in the general administration and operation of the edge server 130. The memory 520 may further include computer program instructions and other information for implementing aspects of the present disclosure. For example, in one embodiment, the memory 520 includes an interface module 524 that generates interfaces for interacting with other computing devices (e.g., the radio unit 122) via an API, CLI, and/or Web interface.

In addition to and/or in combination with the interface module 524, the memory 520 may include the distributed unit 134 and the execution environments 136, which may be executed by the processor 502 to implement various aspects of the present disclosure, such as communicating with the radio unit 122 and executing code on behalf of user devices 102. The memory 520 may further include code 526, which may generally refer to any computer-executable instructions that can be executed in an execution environment 136 to produce a result 528. The result 528 is depicted in FIG. 5 using dotted lines to distinguish that it is not necessarily executable by the processor 502. In some embodiments, the code 526 is also not executable by the processor 502, but rather is executable only by a virtual processor emulated in one of the execution environments 136. Additionally, in some embodiments, the memory 520 may further include, e.g., latency information, information regarding previous executions of the code 526, notifications from user devices 102, or other data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
   a radio unit in communication with an edge server at an edge location of a cloud provider network, wherein the radio unit controls communication over an air interface to a plurality of mobile computing devices on a radio access network; and
   the edge server at the edge location, the edge server comprising a processor and first computer-executable instructions, wherein the processor executes the first computer-executable instructions to implement a distributed unit that performs operations including:
   receiving, via the radio unit, a notification transmitted from a first mobile computing device of the plurality of mobile computing devices that the first mobile computing device is executing an application that is operable to transmit a code execution request;
   in response to receiving the notification that the first mobile computing device is executing the application, configuring a plurality of virtual machine instances to execute code prior to receiving the code execution request;
   receiving, via the radio unit, the code execution request from the first mobile computing device of the plurality of mobile computing devices, the code execution request comprising a request that the edge server execute second computer-executable instructions;
   selecting, from the plurality of virtual machine instances hosted by the edge server, a first virtual machine instance to execute the second computer-executable instructions;
   executing the second computer-executable instructions in the first virtual machine instance to produce a result; and
   transmitting the result to the first mobile computing device via the radio unit.

2. The system of claim 1, wherein the code execution request includes the second computer-executable instructions.

3. The system of claim 1, wherein the application executed on the first mobile computing device generates the code execution request.

4. The system of claim 1, wherein the first mobile computing device generates the code execution request.

5. The system of claim 1, wherein the operations further include determining that the edge server has sufficient available computing resources to execute the second computer-executable instructions in the first virtual machine instance.

6. A computer-implemented method comprising:
   receiving, by a distributed unit implemented on an edge server, a notification transmitted from a mobile computing device that the mobile computing device is executing an application that is operable to transmit a request to execute code;
   in response to receiving the notification that the mobile computing device is executing the application, configuring a first execution environment to execute the code prior to receiving the request;
   receiving, by the distributed unit, the request from the mobile computing device to execute the code in an execution environment hosted by the edge server, wherein the request is received via a radio unit;
   selecting, by the edge server, from a plurality of execution environments hosted by the edge server, the first execution environment to execute the code;
   executing, by the edge server, the code in the first execution environment to generate a result; and
   providing, by the distributed unit, the result to the mobile computing device via the radio unit.

7. The computer-implemented method of claim 6, wherein the first execution environment comprises a virtual machine instance.

8. The computer-implemented method of claim 6, wherein the request includes data to be processed by the code executing in the first execution environment.

9. The computer-implemented method of claim 6, wherein the code comprises one or more of a software image or a serverless compute function.

10. The computer-implemented method of claim 6 further comprising obtaining the code from a data store.

11. The computer-implemented method of claim 6, wherein the request to execute the code in the execution environment hosted by the edge server is generated based at least in part on one or more of a maximum latency requirement, battery level of the mobile computing device, temperature of the mobile computing device, workload of the mobile computing device, available memory of the mobile computing device, available processor of the mobile computing device, available storage of the mobile computing device, or predicted quantity of computing resources that will be utilized when executing the code.

12. The computer-implemented method of claim 6, wherein selecting the first execution environment from the plurality of execution environments is based at least in part on a predicted quantity of computing resources that will be utilized when executing the code.

13. The computer-implemented method of claim 12, wherein the predicted quantity of computing resources is based at least in part on a previous execution of the code.

14. The computer-implemented method of claim 6 further comprising configuring the plurality of execution environments in response to receiving the notification that the mobile computing device is executing the application.

15. One or more non-transitory computer-readable media storing computer-executable instructions that, when executed by an edge server comprising a processor, configure the edge server to perform operations including:

receiving, by a distributed unit implemented on the edge server, a notification transmitted from a mobile computing device that the mobile computing device is executing an application that is operable to transmit a request to execute code;

in response to receiving the notification that the mobile computing device is executing the application, configuring a first execution environment to execute the code prior to receiving the request;

receiving, via a radio unit, the request from the mobile computing device to execute the code;

selecting, from a plurality of execution environments, the first execution environment hosted at a location of the edge server;

executing the code in the first execution environment to generate a result; and providing the result to the mobile computing device via the radio unit.

16. The one or more non-transitory computer-readable media of claim 15, wherein the plurality of execution environments comprises a first plurality of execution environments hosted by the edge server and a second plurality of execution environments in a cloud provider network.

17. The one or more non-transitory computer-readable media of claim 15 storing further computer-executable instructions that, when executed by the edge server, configure the edge server to perform further operations including determining, based at least in part on the request, to execute the code in an execution environment hosted by the edge server.

18. The one or more non-transitory computer-readable media of claim 15, wherein the edge server is physically located in proximity to the radio unit.

19. The one or more non-transitory computer-readable media of claim 15 storing further computer-executable instructions that, when executed by the edge server, configure the edge server as a distributed units.

* * * * *